UNITED STATES PATENT OFFICE.

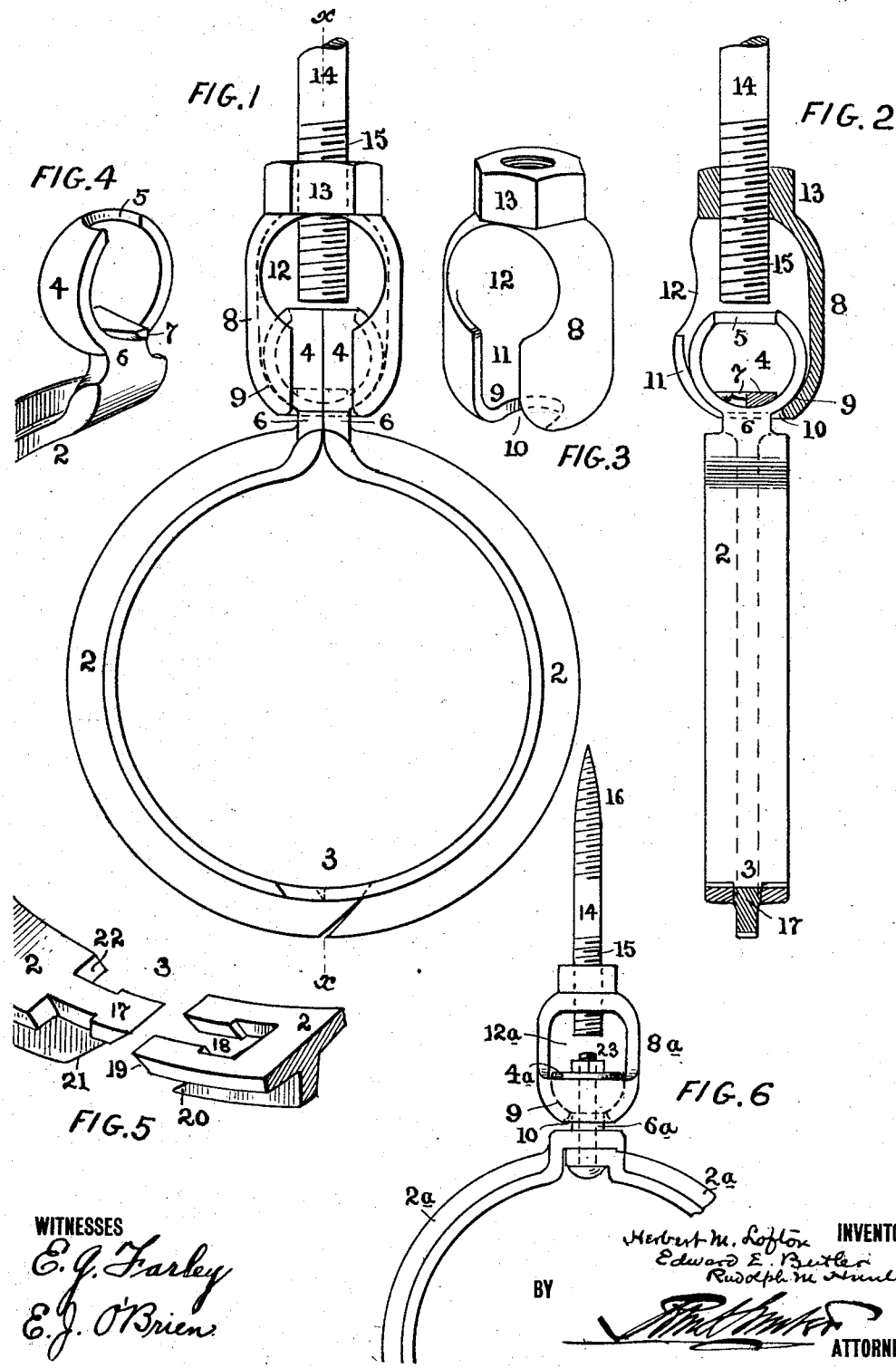

HERBERT M. LOFTON AND EDWARD E. BUTLER, OF CHATTANOOGA, TENNESSEE, AND RUDOLPH M. HUNTER, OF PHILADELPHIA, PENNSYLVANIA.

PIPE-HANGER.

1,013,187.  Specification of Letters Patent.  Patented Jan. 2, 1912.

Application filed April 9, 1909. Serial No. 488,987.

*To all whom it may concern:*

Be it known that we, HERBERT M. LOFTON and EDWARD E. BUTLER, both citizens of the United States, and residents of Chattanooga, in the county of Hamilton and State of Tennessee, and RUDOLPH M. HUNTER, a citizen of the United States, and resident of Philadelphia, in the county of Philadelphia and State of Pennsylvania, have invented an Improvement in Pipe-Hangers, of which the following is a specification.

Our invention has reference to pipe hangers, and consists of certain improvements which are fully set forth in the following specification and shown in the accompanying drawings which form a part thereof.

The object of our invention is to provide a pipe hanger which shall be adjustable, inexpensive to construct, and easily applied.

Our improvements consist in general in a suspension device for the pipe preferably in the form of a ring having at its top a head or ball structure, combined with a socket part having a seat for the head or ball of the ring part and provided with a screw or other device by which it may be secured to the ceiling or over-head joist, the construction being such that the ball or head of the pipe supporting part may be detachably inserted within the socket and free to adjust itself in all directions to follow the alinement of the pipe.

Our improvements further comprise the forming of the socket portion with an enlarged opening at its upper part through which the head or ball portion may be introduced within the socket, and said socket portion having a contracted lower part to form the bearing for sustaining the head or ball and the ring portion connected to it.

Our invention also comprises the ball and socket construction above specified and is further restricted to forming the ring part in a plurality of sections preferably having the ball or head divided with part formed integral upon adjacent sections.

Our invention also comprehends details of construction which together with the features above specified will be better understood by reference to the drawings, in which:

Figure 1 is an elevation of a pipe hanger embodying our invention with the upper end of the supporting screw broken away; Fig. 2 is a sectional elevation of the same on line $x$—$x$; Fig. 3 is a perspective view of a socket portion; Fig. 4 is a perspective view of a portion of the ball or head and ring part; and Fig. 5 is a perspective view showing the construction of the uniting joint for the two parts of the ring support.

2, 2 are two semi-annular ring portions which are united by a detachable joint 3 at the bottom, and having at the top the two semispherical head or bail-shaped portions 4. These semispherical ball portions 4 are preferably hollow forming an opening 5 at the top; and are connected to the ring portions 2 by neck portions 6. They may further be provided with projecting tongues 7 which interlock when the two parts 4, 4 are brought together as indicated in Fig. 1 to constitute the complete spherical ball or head.

8 is a socket portion and is formed of a hollow casting contracted at the bottom to form a bearing 9 terminating in an aperture 10. The aperture 10 is connected by a slot 11 with an enlarged aperture 12 at the upper part of the socket portion through which the head formed by the parts 4, 4 may be inserted when the socket portion is turned at right angles in a vertical plane to the ring portions 2, 2. After the socket has been placed over the head or ball portions 4, 4 it may then be turned in an upright position, the neck portion 6 passing through the slot 11 down into the bottom opening 10. The upper portion 13 of the socket is screw-threaded and receives the suspension screw 14, the bottom of the shank of which is screw-threaded at 15 by which the socket may be adjusted upon the shank 14 vertically. It is preferable that the parts 4 should be hollow and the aperture 5 therein of larger diameter than the suspension screw 14 so as to give greater capacity of vertical adjustment upon the said screw by permitting the lower part to enter the hollow head 4, 4. The upper end of the screw 14 may be pointed and provided with screw threads as is customary in lag screws.

Broadly considered, it is immaterial how the sections 2, 2 are secured together, but in the preferred form these are interlocked at the bottom by a joint which holds them engaged when the two upper ends of the ring portions 2, 2 are brought together and maintained in such position within the socket. This detachable connection 3 is shown in Fig. 5. On one of the sections 2 there is provided a central slot 18 upon each side of which are formed tongues and the ends of which are beveled as at 19. Below this slot 18 the rib of the section 2 is provided with a pointed tongue 20 downwardly extending. The other section 2 has its end formed as a substantial counterpart of the construction above described, and more particularly may be said to comprise a tongue 17, lateral beveled faces 22 at the root of the shank, and a rib having an inclined front edge 21 below the tongue. It is further pointed out that the tongue 17 and the slot 18 are made to interlock by making the tongue wider at the end and the slot wider at the base so that when the two parts are engaged they cannot be pulled apart. There is also a slight gap between the parts 20 and 21 when in complete engagement, as indicated in Fig. 1, this construction being for the purpose of enabling the tongue to be inserted in the slot 18 when the upper portions of the parts 2, 2 are spread apart, and then be rotated to bring the upper parts together and to cause the interlocking parts at the bottom to assume the position shown in Figs. 1 and 2. When his position is assumed it is evident that the enlarged head of the tongue 17 cannot be pulled out of the slot in the direction of the length of the tongue. It is further evident that the right hand part 2 cannot shift upwardly upon the left hand part because of the projection 20. It is also evident that the right hand part cannot shift downward upon the left hand part 2 because of the beveled end 19 striking the beveled shoulders 22. In the same manner the left hand part 2 cannot be shifted with respect to the right hand part. It will thus be seen that when the two parts 2, 2 are brought together at the top as indicated in Fig. 1, the bottom portions will be interlocked at 3 so as to be inseparable in any direction. In this manner the only function required of the socket 8 is to prevent disengagement of the part 2, 2 to prevent the two parts of the head 4, 4 spreading apart.

While we prefer the particular interlocking construction above described, it is evident that any other suitable interlocking means may be employed in lieu thereof, if so desired.

We have described our invention in that form which we believe to be most satisfactory for commercial use, but it is to be understood that we do not restrict ourselves to the minor details as these may be modified in various ways without departing from the spirit of the invention.

Having now described our invention what we claim as new and desire to secure by Letters Patent, is:

1. A pipe hanger composed of a ring frame having a ball shaped head at its top and a short interposed neck portion of smaller cross section than the ball shaped part, combined with a suspension screw, and a socket portion secured to the screw and having an interior chamber of a cross section to freely receive the ball shaped head of the ring frame and a height greatly in excess of the height of the ball shaped head and said socket portion having an upper side opening of an area equal to the transverse sectional area of the ball shaped head and further having a vertical slotted portion opening from the said side opening and extending down to the bottom for receiving the neck portion of the hanger, the height of the interior chamber portion from the bottom to the large opening in the side thereof being greater than the length of the neck portion below the ball shaped head, the combination being such that the ball shaped head must be inserted through the large opening of the socket with the ring frame in a position substantially at right angles to the length of the socket and screw, then shifted downward within the socket away from the screw and with the neck portion received within the slotted part and then the ring frame and ball shaped upper part thereof rotated into a vertical position and so that the shortness of the neck portion prevents the upward rising of the ring part to permit accidental disengagement of the ball shaped part from the socket.

2. In a pipe hanger, a ring shaped support for the pipe having at its upper part a hollow ball shaped portion open at the top, combined with a socket portion in which the ball shaped portion is adjustably journaled, and a suspension screw having its lower part screw threaded and adjustably engaging the upper portion of the socket portion out of contact with the ball shaped portion and in which the area of the screw is smaller than the area of the open end of the hollow ball shaped portion to permit extended adjustment of the socket portion upon the screw without causing engagement of the ball shaped portion with the screw or interference with the free adjustment of said ball shaped portion in the socket.

In testimony of which invention, we hereunto set our hands.

HERBERT M. LOFTON.
EDWARD E. BUTLER.
R. M. HUNTER.

Witnesses as to Lofton and Butler:
M. V. MINOR,
T. M. GENAR.

Witnesses as to R. M. Hunter:
R. M. KELLY,
E. G. FARLEY.

Copies of this patent may be obtained for five cents each, by addressing the "Commissioner of Patents, Washington, D. C."